(12) United States Patent
Johnson et al.

(10) Patent No.: US 6,742,761 B2
(45) Date of Patent: Jun. 1, 2004

(54) MINIATURE LATCHING VALVE

(75) Inventors: A. David Johnson, San Leandro, CA (US); Glendon Benson, Danville, CA (US)

(73) Assignee: TiNi Alloy Company, San Leandro, CA (US)

(*) Notice: Subject to any disclaimer, the term of this patent is extended or adjusted under 35 U.S.C. 154(b) by 19 days.

(21) Appl. No.: 10/121,017

(22) Filed: Apr. 10, 2002

(65) Prior Publication Data

US 2002/0171055 A1 Nov. 21, 2002

Related U.S. Application Data

(60) Provisional application No. 60/282,644, filed on Apr. 10, 2001.

(51) Int. Cl.$^7$ ............................................. F16K 31/00
(52) U.S. Cl. ............................ 251/11; 251/75; 251/319
(58) Field of Search .............................. 251/11, 75, 319, 251/331, 335.2

(56) References Cited

U.S. PATENT DOCUMENTS

| | | | | |
|---|---|---|---|---|
| 3,445,086 A | * | 5/1969 | Quinn | 251/11 |
| 3,659,625 A | * | 5/1972 | Coiner et al. | 251/75 |
| 4,558,715 A | * | 12/1985 | Walton et al. | 251/75 |
| 5,325,880 A | * | 7/1994 | Johnson et al. | 251/11 |
| 6,247,493 B1 | * | 6/2001 | Henderson | 251/129.05 |

OTHER PUBLICATIONS

NASA Jet Propulsion Lab., Closed/Momentary–Opening/Closed Valve, Nov. 2000.

* cited by examiner

*Primary Examiner*—John Bastianelli
(74) *Attorney, Agent, or Firm*—Richard E. Backus

(57) ABSTRACT

An SMA actuated miniature latching valve for on and off control of fluid flow. A valve closure includes a poppet for opening and closing the fluid flow path. The poppet is operated responsive to an actuator mechanism which has SMA wires arranged to be actuated by electric resistant heating. Actuation causes different ones of the wires to contract and pull the poppet either toward or away from a valve seat. A latching mechanism comprising a conical spring operates between two bistable positions which hold the poppet either fully open or fully closed without further application of power to the actuators. A method of forming a secure mechanical and electrical connection between an SMA wire end and its support includes the steps of swaging a metal cone between a cone-shaped hole in the support and the wire end.

6 Claims, 4 Drawing Sheets

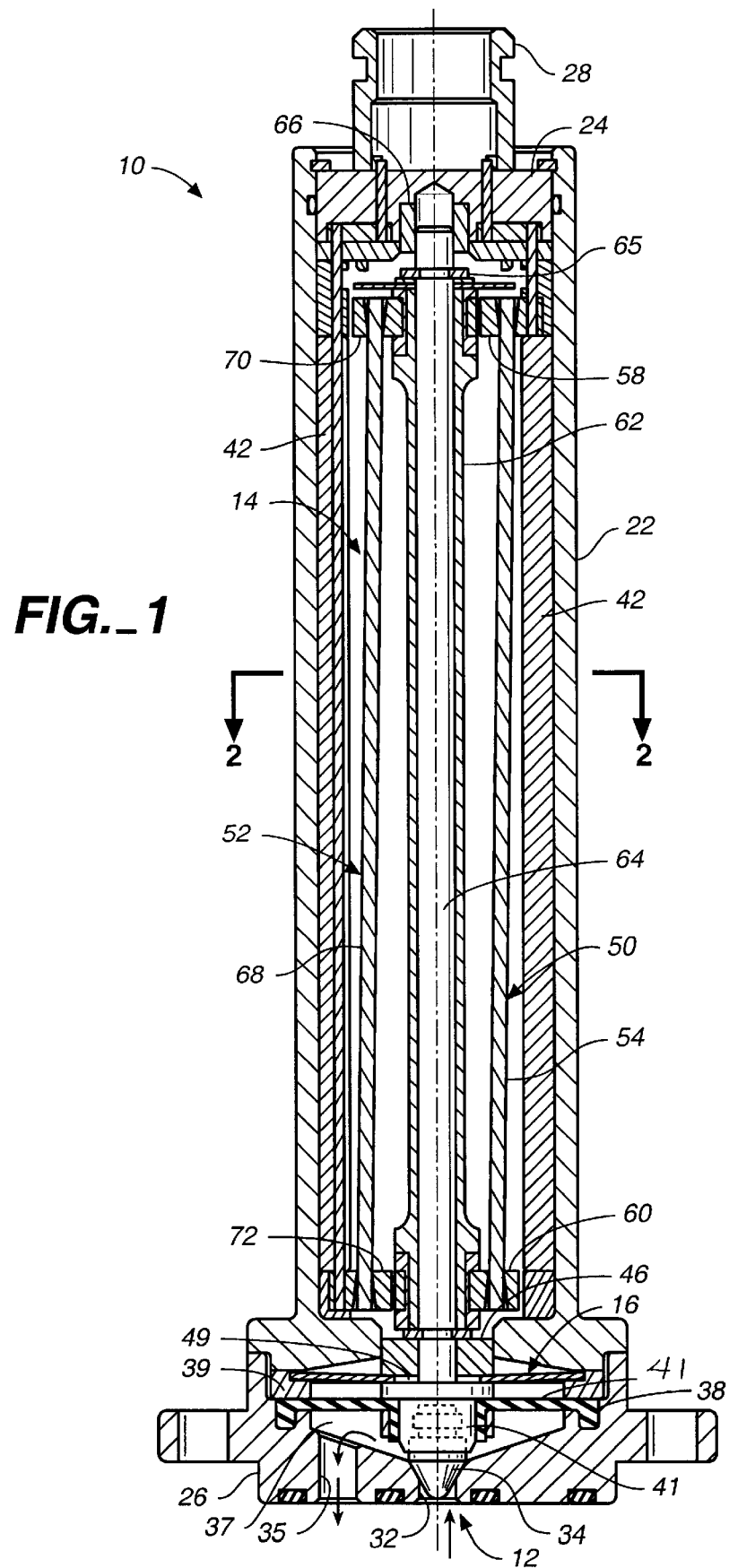
FIG._1

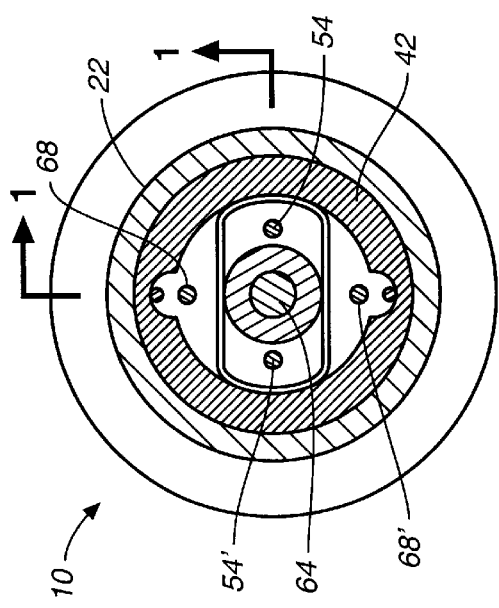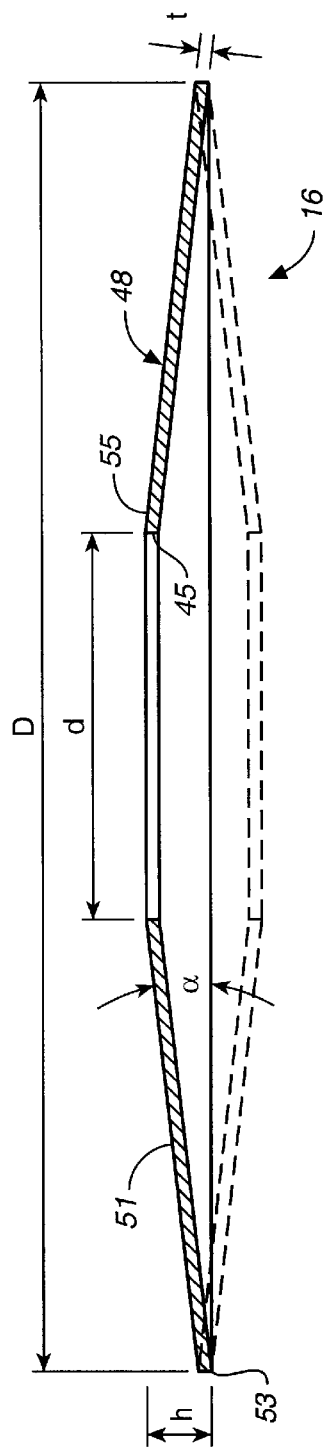

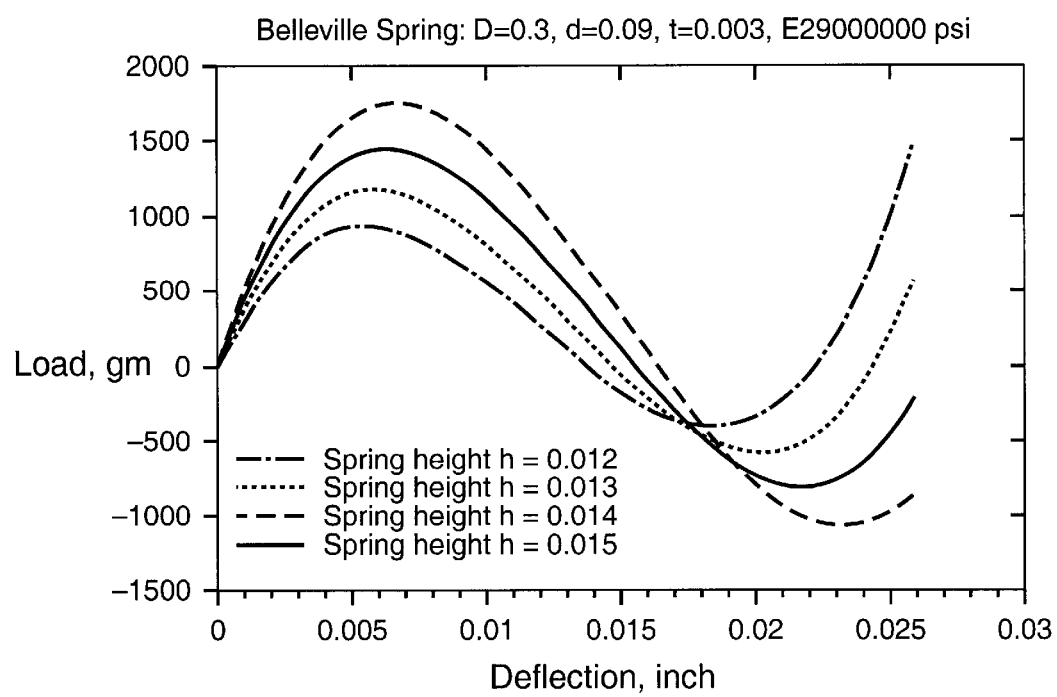
FIG._4

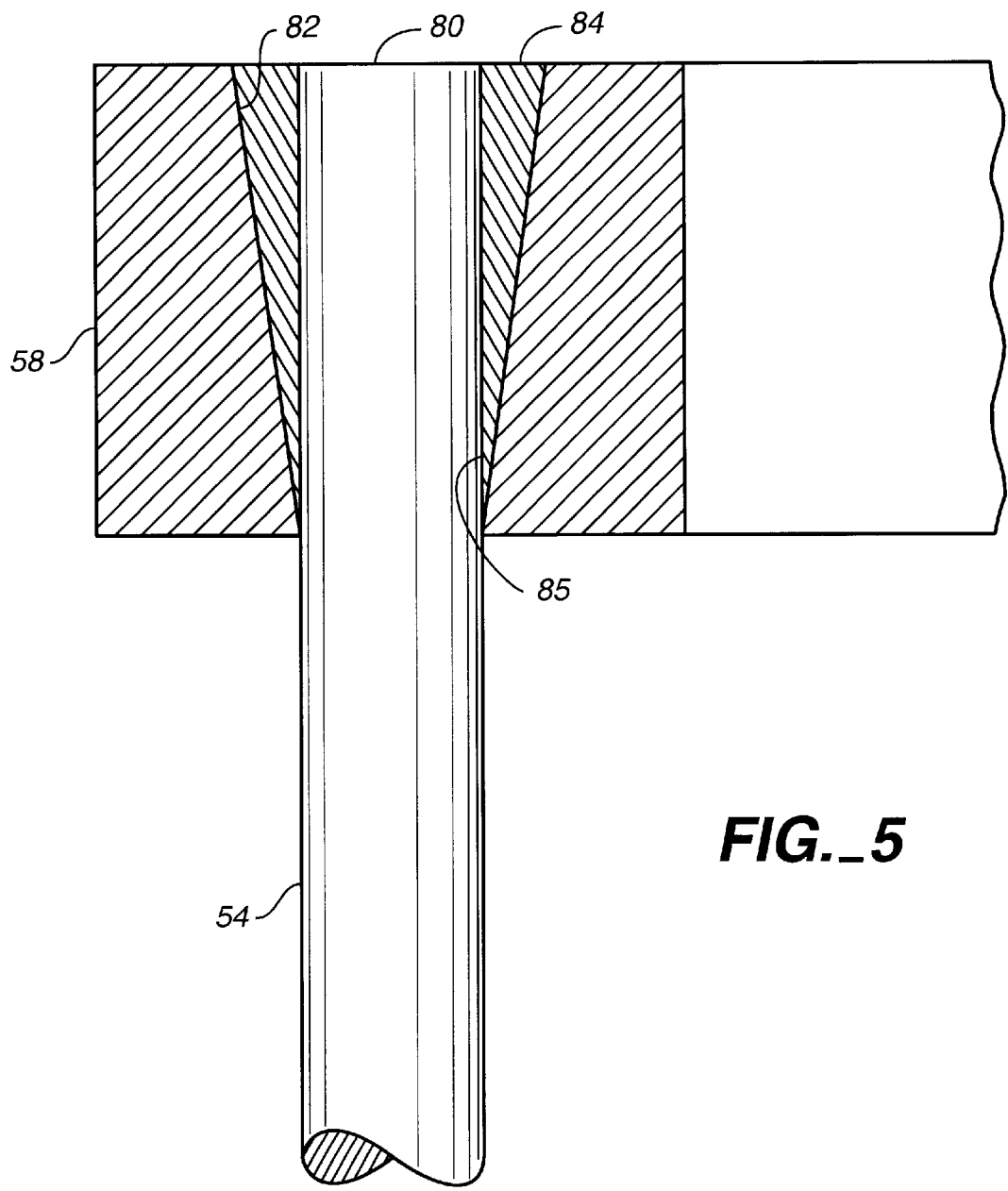
FIG._5

MINIATURE LATCHING VALVE

CROSS-REFERENCE TO PRIOR APPLICATION

This application claims the benefit under 35 USC §119(e) of U.S. provisional application Serial No. 60/282,644 filed Apr. 10, 2001.

BACKGROUND OF THE INVENTION

1.0 Field of the Invention

This invention relates in general to latching valves, and more particularly to miniature electrically-actuated latching valves.

2.0 Description of the Related Art

Latching valves have a variety of uses including commercial applications such as opening and closing valves, for example, in the semiconductor manufacturing industry; air sampling applications; for tethered balloon studies; for liquid flow control; in the vacuum industry; and in outer space such as for space vehicles.

OBJECTS

It is a general object of the invention to provide a new and improved latching valve which is light weight and of miniature size.

Another object is to provide a miniature latching valve which seals very well.

Another object is to provide a miniature latching valve which can latch in both open and closed states and which requires power only when changing states.

Another object is to provide a robust, lightweight, low-power miniature latching valve with extremely low leak rates, which can be baked for cleanness, and which can meet the requirements of NASA for use in outer space.

Another object is to provide an improved method for attaching the end of an SMA wire to a support structure.

BRIEF DESCRIPTION OF THE DRAWINGS

FIG. 1 is a longitudinal cross sectional view taken along the line 1—1 of FIG. 2 of a latching valve assembly in accordance with one preferred embodiment of the invention.

FIG. 2 is a lateral cross sectional view taken along the line 2—2 of FIG. 1.

FIG. 3 is lateral cross sectional view, to an enlarged scale, of a bistable spring which is a component of the assembly shown in FIG. 1.

FIG. 4 is a graph that plots load as a function of deflection of the spring of FIG. 3 for different spring heights.

FIG. 5 is a cross sectional view, to an enlarged scale, showing a connection that is made by a method of the invention for attaching an end of one of the shape memory alloy wires to a support structure in the assembly of FIG. 2.

DESCRIPTION OF THE PREFERRED EMBODIMENTS

In the drawings, FIGS. 1 and 2 illustrate generally at 10 a miniature latching valve assembly in accordance with one preferred embodiment of the invention. The valve of this invention has particular application for use on deep flight space vehicles, such as in NASA's missions to Titan, one of Saturn's moons. In such a mission, as the vehicle descends toward a landing the valves will open and close to capture samples of gas for subsequent analysis by gas chromatography to determine the composition of Titan's atmosphere. In this type of application the valves must meet strict requirements. They must be light weight, small and robust, and they also must seal very well.

Latching valve assembly 10 is comprised of three principal components: a valve closure 12, an actuator mechanism 14 and a latching mechanism 16. These components are assembled within a cylindrical valve shell 22 which is fitted on one end with an upper cap 24 and at its other end with an inlet/outlet cap 26. The upper cap is fitted with a mounting tube 28 for attachment to a support, such as the structure of a space vehicle.

Valve closure 12 is comprised of poppet 34 which is mounted centrally of and for movement with a flexible diaphragm 36 for on/off control of gas flow. The diaphragm forms a chamber 37 above inlet/outlet cap 26 for gas containment. Cap 26 is formed with an axially centered circular inlet port 32 which communicates with chamber 37. An outlet port 35 is formed through one side of cap 26. As desired, the inlet and outlet ports could be reversed. The poppet is attached to the lower end 41 of a cylindrical pintle 64 which moves axially up and down responsive to the control of actuator mechanism 14. When the poppet is raised to its open position shown in FIG. 1, the flow path is from the inlet port up into chamber 37 and then down through the outlet port. The valve is fully closed in the poppet's lower position and is fully open in its raised position. The outer rim of the diaphragm is captured between a circular groove 38 formed on the upper face of cap 26 and a ring 39 which fits against the outer circular rim of latching mechanism 16 and the lower end of valve shell 22.

Latching mechanism 16 controls the on/off bistable states of the valve. The latching mechanism is shown in detail in FIG. 3 and is comprised of metal spring 48 in conical shape with a circular center opening 45. The spring has a conical wall 51 which slopes inward at an angle $\alpha$ from a circular outer rim 53 to a circular inner rim 55. The wall has an axial height h between the two rims. The inner rim of the spring which defines opening 45 is mounted in a groove 49 in the lower end of pintle 64, which forms a part of actuator mechanism 14. The spring is similar to the type of hardware known as a Belleville washer. Conventional Belleville washers can not operate in bistable modes, but in this invention the spring is made bistable by a combination of specific metal properties and configuration. Spring 48 is of a specific stiffness, i.e. elasticity, which in turn depends on the specific type of metal from which it is formed. The configuration comprises a specific height h, a specific outer diameter D of outer rim 53, a specific inner diameter d of inner rim 55, and a specific thickness t.

For the properties contemplated in the latching mechanism of this invention, the spring 48 is initially formed as a flat blank from a plate of precipitation hardened stainless steel, for example SS 17-7 PH steel. The blank has a thickness t in the range of 0.050 to 0.100 mm, and preferably 0.076 mm with an outer diameter D in the range of 0.25 to 0.50 inches, and preferably 0.30 inches. Center opening 45 is punched through the blank with an inner diameter d in the range of 0.045 to 0.075 inches. The blank is then upset into a conical shape as shown in FIG. 3 having a wall slope angle $\alpha$ in the range of 7° to 9° resulting in a height h in the range of 0.012 to 0.015 inches. It is this combination of specific properties which results in a load-deflection performance, in accordance with the curves shown FIG. 4, which is optimum for a bistable latch of sufficiently small size for the type of narrow enclosure required for a miniature valve used on deep flight space vehicles. The graph of FIG. 4 shows the variations in the load-deflection curves of Belleville washer springs having four different heights and in which for each case D=0.3", d=0.06", t=0.003" and the metal's Young of modulus E=99,000,000 psi. These curves are derived from the load-deflection formula for a Belleville spring, which is:

$$P = \frac{E}{(1-\mu^2)MR^2}[(h-f/2)(h-f)t + t^3]f$$

where:
P=applied load
E=Young's modulus
$\mu$=Poisson's ratio and
M=6/(D/d−1)²/(In D/d)(D/d)²

Alloys such as BeCu have been commonly used for Belleville washers. However, to achieve a bistable actuator of such a shaped spring, there has to be the right combination of elastic properties and spring configuration. For example, if a BeCu spring in the shape of a conventional Belleville washer is stressed to beyond its yield point, then the spring will not recover its shape and will not operate in a bistable mode. The specific combination of metal properties and configuration of the invention for spring 48 allow it to snap back and forth between its two positions without exceeding the yield point, thereby enabling the bistable operation. FIG. 4 shows in solid line the spring in one of its bistable positions, while the broken line shows its other bistable position.

Actuator mechanism 14 is comprised of two elements: a first actuator 50 which operates the valve to its open state and a second actuator 52 which operates the valve to its closed state. These actuators are configured in a specific nested manner which is sufficiently small to enable their installation in a confined package suitable for use on deep flight space vehicles.

First actuator 50 is comprised of a pair of shape memory alloy ("SMA") wires 54, 54' (FIG. 2). These two wires are mounted at their upper ends to a bracket 58 which is attached to the upper end of a mid-housing 42 that fits within the valve shell. The lower ends of these two wires are attached to a drive bar 60 which is attached to the lower end of an elongate tubular pintle sleeve 62 which fits about pintle 64, A snap ring 65 releasably connects the upper ends of the pintle and sleeve so that they move together. The pintle's lower end is attached to an annular guide 46 which is slidably fitted within an opening in the lower end of valve shell 22. The upper end of the pintle is slidably mounted within a bushing 66 which is fitted within inlet cap 24. The lower end of guide 46 is in releasable contact with the inner rim of spring 48.

When the other pair of actuator wires 68, 68' are deactivated so that they revert to their plastically deformable states, the two SMA wires 54, 54' are actuated by being heating through their phase change transition temperatures so that they revert to their memory shapes. This causes them to contract in length so that they act in unison to exert an upward pulling force on the pintle sleeve, causing the pintle to slide up. The pintle in turn moves poppet 34 up to the valve open position while snapping the spring to its upwardly convex shape. The poppet is held open by the pintle and spring 48, which remains in its upper bistable shape when power to the wires 54, 54' is turned off. This enables the valve to remain latched in the open state until power is applied to second actuator 52.

Second actuator 52 is comprised of the pair of SMA wires 68, 68' (FIG. 2). These two wires are mounted at their upper ends to a drive bar 70 which is attached to the upper end of pintle sleeve 62. The lower ends of these two wires are attached to a bracket 72 which is mounted to the lower end of mid-housing 42. When the other pair of wires 54, 544 are deactivated so that they revert to their plastically deformable states, the two SMA wires 68, 684 are actuated by being heating through their phase change transition temperatures. This causes the wires to contract in length. They then act in unison to exert an downward pulling force on the pintle sleeve, causing the pintle to slide down. The pulling forces on the pintle move guide 46 down against spring 48 with a force which is sufficient to snap the spring down to its downwardly convex bistable shape. Power to wires 68, 68' can then be turned off, enabling the poppet to be latched in its closed state by the force of the spring until power is applied to the first actuator.

As is well known, the SMA material of which the wires of actuators 50 and 52 are comprised undergoes a crystalline phase transformation from martensite to austenite when heated up through the material's phase change transformation temperature. When below that temperature in a "cold state" the material can be plastically deformed responsive to stress. In this invention the stress on one pair of the actuator wires when in a cold state is applied by the force of the other wire pair.

When the SMA wires are heated through the transformation temperature, each forcefully reverts to its "memory shape" while exerting considerable force. In this invention the wires contract in length as they revert to their memory shapes. The heating is by electrical resistance with opposite ends of each pair of wires connected in a circuit to a suitable source of electric power, not shown. The heating cycles can be controlled by a suitable computer, not shown.

The invention allows for certain components of latching valve 10 to be baked for sterilization. This enables the components which are to be exposed to gases for gas chromatography analysis or the like to be sufficiently clean so as to not contaminate the results. The SMA properties of the actuator wires cannot survive the high temperatures required for such baking. Thus, prior to baking the wires can be removed by the steps of disassembling upper cap 24 and opening snap ring 65 to release sleeve 62 from pintle 64. The SMA wires along with the parts to which they are attached, including mid-housing 42, brackets 58 and 72 and drive bars 60 and 70, can then be withdrawn axially from the valve shell. The valve parts remaining are then put into a vacuum and baked out to sterilize their surfaces.

The invention provides a method for securely attaching the ends of SMA wires to their supporting structures. FIG. 5 illustrates the attachment of upper end 80 of SMA wire 54 to support bracket 58 by carrying out the steps of the method.

The SMA wires of the latching valve have diameters of only about 15 mils. Each wire when actuated will pull with forces in the range of one to two kilograms, and two wires in unison will pull with from two to four kilograms force. These high forces are necessary to make good seals in the valve. If one were to secure an SMA wire end to a support by welding, then this would result in metal fatigue and eventual failure at the connection. If the wire end were to be secured by wrapping it around a hole in the support, then actuation of the wire would cause the end to change shape. This would create a point of strain concentration at the connection, causing the wire to break.

The attachment method of the invention solves these problems by forming a wire-to-support connection which is very secure and which will not fail over extended usage. The method comprises providing the support 58 with a cone-shaped through hole 82 having its small end commensurate in size with the diameter of wire 54. Next the wire end 80 is inserted into the hole. Then a cone 84, preferably of stainless steel metal, formed with an axial bore 85, is provided commensurate in size and shape with hole 82. The cone is driven down through the large end of the hole with sufficient force to swage the cone about the wire end. The swaging force places the wire end under a compression load which somewhat deforms the wire. This traps the wire in the hole, while maintaining the wire in a perfectly straight shape for use in actuating the latching valve.

The attachment method makes a connection which will be sufficient to support the entire strength of the SMA wire. That is, the wire will break before pulling out of hole 82. This method has a number of advantages over convention methods for attaching SMA wires: the parts are simple and inexpensive, the method is simple, the connection is purely mechanical and does not require heat treatment, the connection will support the wire's entire strength, and it also makes an electrical connection in the actuating circuit for heating the SMA.

What is claimed is:

1. A latching valve of miniature size for on or off control of the flow of a fluid, the latching valve comprising a valve closure having a poppet and a seat, the poppet being moveable between open and closed positions with respect to the seat for respectively opening and closing flow of the fluid through the seat, an actuator mechanism having a structure that moves the poppet between the closed and open positions, the structure comprising an actuator element comprised of a shape memory alloy which undergoes a crystalline phase transformation and resulting shape change from a low temperature deformable phase to a high temperature memory phase when the element is heated through the alloy's phase change transformation temperature, the element being positioned for moving the poppet responsive to the shape change, and a latching mechanism comprising a spring having a conical wall which has properties that are sufficient to cause the wall to change shape between first and second axial bistable positions responsive to an axial force, the wall being characterized in: sloping at an angle $\alpha$ from a circular outer rim having a diameter D to a circular inner rim having a diameter d, having a thickness t, having an axial height h between the rims, and being formed of a metal, the wall in the first position holding the poppet in the open position and the wall in the second position holding the poppet in the closed position.

2. A latching valve as in claim 1 in which the properties are selected from the group consisting of the axial height h being in the range of 0.012 to 0.015 inches, the diameter D being in the range of 0.25 to 0.50 inches, the diameter d being in the range of 0.045 to 0.075 inches, the thickness t being in the range of 0.050 to 0.100 mm, and the metal being stainless steel.

3. A latching valve as in claim 1 in which the structure comprises an operating element which moves while applying the axial force against the inner rim.

4. A latching valve as in claim 3 in which the operating element comprises a pintle which is mounted for axial movement along the valve.

5. A latching valve as in claim 4 in which the pintle is connected with the poppet.

6. A latching valve as in claim 1 in which the actuator element comprises a wire which undergoes the shape change by contraction.

* * * * *